(12) United States Patent
Stoughton

(10) Patent No.: US 8,414,343 B2
(45) Date of Patent: Apr. 9, 2013

(54) TECHNIQUES TO DISCHARGE STATIC ELECTRICITY IN WATER SLIDERS

(75) Inventor: Anthony F. Stoughton, Castle Rock, CO (US)

(73) Assignee: Red Oaks Development, LLC, Castle Rock, CO (US)

( * ) Notice: Subject to any disclaimer, the term of this patent is extended or adjusted under 35 U.S.C. 154(b) by 231 days.

(21) Appl. No.: 12/851,636

(22) Filed: Aug. 6, 2010

(65) Prior Publication Data
US 2012/0034830 A1    Feb. 9, 2012

(51) Int. Cl.
*B63B 35/73* (2006.01)

(52) U.S. Cl.
USPC .............................................. 441/65; 441/74

(58) Field of Classification Search ............ 441/65, 441/74; 280/607, 610, 611, 612, 613, 617, 280/618
See application file for complete search history.

(56) References Cited

U.S. PATENT DOCUMENTS

| | | | |
|---|---|---|---|
| 4,272,577 A | 6/1981 | Lyng | |
| 4,349,212 A * | 9/1982 | Svoboda | .................... 280/610 |
| 5,018,721 A | 5/1991 | Nagahisa | |
| 5,052,682 A | 10/1991 | Croce, Jr. et al. | |
| 5,076,571 A | 12/1991 | Croce, Jr. et al. | |
| 5,114,482 A | 5/1992 | Hertel | |
| 5,315,289 A | 5/1994 | Fuller et al. | |
| 5,407,615 A | 4/1995 | Norville | |
| 5,914,298 A | 6/1999 | Karydas | |
| 5,948,472 A | 9/1999 | Lawrie | |
| 7,708,302 B2 | 5/2010 | Wilson | |
| 2002/0001718 A1 | 1/2002 | Veerasamy | |
| 2002/0127404 A1 | 9/2002 | Veerasamy | |
| 2003/0071628 A1 | 4/2003 | Zank et al. | |
| 2004/0067368 A1 | 4/2004 | Veerasamy | |
| 2004/0224161 A1 | 11/2004 | Veerasamy | |
| 2006/0105168 A1 | 5/2006 | Willemsen et al. | |
| 2007/0190284 A1 | 8/2007 | Park | |
| 2008/0088099 A1 | 4/2008 | Felix | |
| 2009/0049780 A1 | 2/2009 | Pulte et al. | |
| 2009/0176034 A1 | 7/2009 | Ruuttu et al. | |
| 2010/0022695 A1 | 1/2010 | Patel | |

OTHER PUBLICATIONS

[online];[published on Jan. 2009];[retrived on Jul. 21,2010]; retrieved from http://engineering.dartmouth.edu/news-events/ice-engg.html.

* cited by examiner

*Primary Examiner* — Lars A Olson

(74) *Attorney, Agent, or Firm* — Kenneth C. Brooks

(57) ABSTRACT

The present invention provides a water slider that features an electrically insulative body extending along a longitudinal axis and having opposed surfaces with a perimeter edge extending therebetween. An electrical conductor is positioned upon one of the surfaces; and a discharge connector is in electrical communication with the electrical conductor and disposed upon said perimeter edge. The electrical conductor may be one or more of a plurality of configurations.

20 Claims, 4 Drawing Sheets

TECHNIQUES TO DISCHARGE STATIC ELECTRICITY IN WATER SLIDERS

BACKGROUND

This invention relates to sliders used to traverse bodies of water and, more particularly, to sliders and techniques for the manufacture thereof for control the friction between the slider and the water as they traverse the same.

There is evidence of people sliding over bodies of water for over 5,000 years. The earliest people known to slide over bodies of water are distant relatives of the Sami that used skis to slide over crystalline water ice, commonly referred to as snow. The earliest form of slider is simply described by its name, ski with translates from Old Norse meaning "a stick of wood".

Slider technology has over the years from that of a pair of substantially planar substrates, commonly referred to as skis, to a single board having much greater width that the skis, referred to as a snowboard. In addition great strides are being undertaken to improve the performance of sliders through use of material science to reduce friction between the slider and the body of water in contact therewith, in this manner, the speed at which the slider travels over the body of water for a given driving force is inversely proportional to the amount of friction present. Friction occurs from a variety of circumstances, such as dry friction. Dry friction results from dry snow particles touching the slider. Capillary suction may cause friction and results from liquid water adheres to the slider, production a vacuum. Contaminant friction may also reduce the speed of the slider. Contaminant friction results from the presence of unwanted material present between the slider and the body of water in contact therewith. Examples of unwanted material include dirt, pollen, rock, dust and the like. Static electricity also generates friction. Static electricity is produced as a slider produced from hydrophobic impregnated polymer TEFLON or UHMW-OE traversing the traverses.

There is a need, therefore, to provide techniques to reduce friction between sliders and bodies of water in contact with the slide.

BRIEF SUMMARY

The present invention provides a water slider that features an electrically insulative body extending along a longitudinal axis and having opposed surfaces with a perimeter edge extending therebetween. An electrical conductor is positioned upon one of the surfaces; and a discharge connector is in electrical communication with the electrical conductor and disposed upon said perimeter edge. The electrical conductor may be one or more of a plurality of configurations. In one embodiment the electrical conductor includes a plurality of spaced apart conductive paths in superimposition with the one of the opposed surfaces and encapsulated by the insulative body. The electrical conductor is also described as including a plurality of spaced apart conductive paths extending across a width of the one of the opposed surfaces and further including a conductive layer covered by a portion of the electrically insulative body; with adjacent paths being in electrical communication and forming an oblique angle therebetween. The electrical conductor is also described as including a plurality of spaced apart conductive paths extending parallel between opposed regions of the discharge connector. The electrical conductor is also described as including first and second sets of conductive paths, with the first set extending across a width of one of the opposed surfaces, with adjacent paths being in electrical communication and forming an oblique angle therebetween. The electrical paths of the second set extending transversely to the first set. The electrical conductor is also described as comprising a conductive coating disposed upon the one of the opposed surfaces. In yet another embodiment; the electrical conductor includes a conductive coating covering the entire area of the one of the oppose surfaces. These and other embodiments are discussed more fully below.

BRIEF DESCRIPTION OF THE DRAWINGS

FIG. 8 bottom view the snowboard shown in FIG. 7 in accordance with a fifth alternate embodiment.

DETAILED DESCRIPTION

Figure 1:
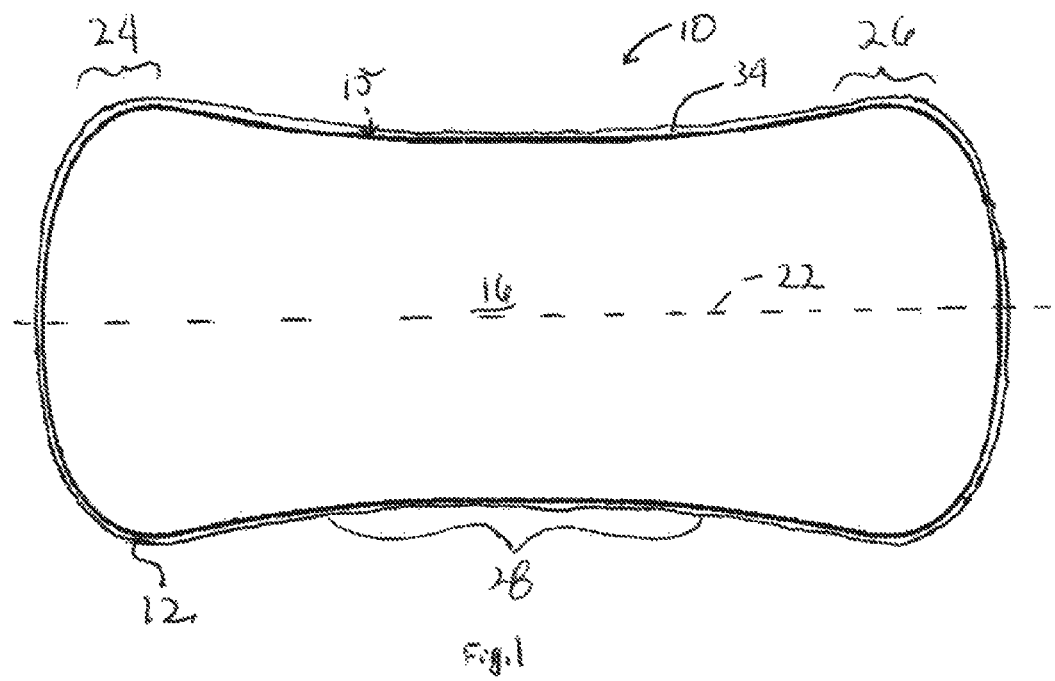
FIG. 1 bottom view of a prior art snowboard in accordance with the present invention with electrical conductors being absent.
Figure 2:
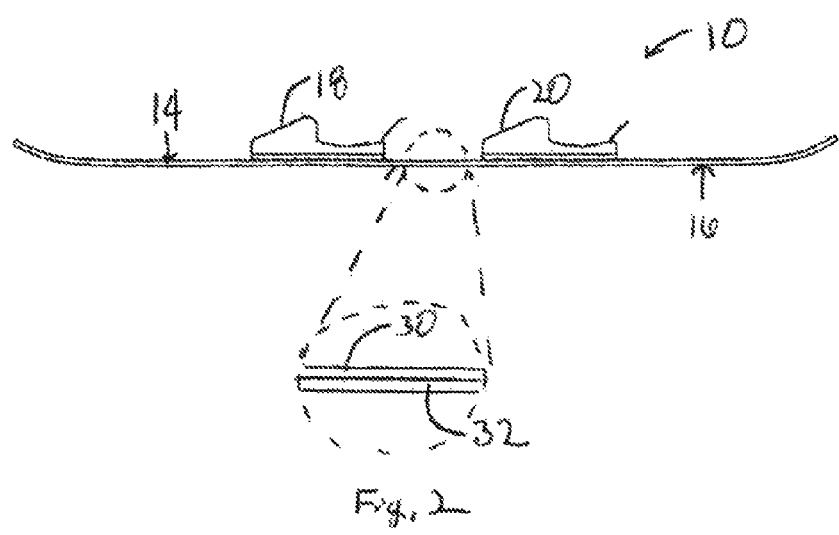
FIG. 2 a side view of the snowboard shown in FIG. 1.

Referring to FIGS. 1 and 2, a snowboard 10 includes a body 12 having opposed surfaces 14 and 16 and a perimeter surface 15, which extends therebetween. A pair of bindings 18 and 20 is fixedly attached to surface 14. Bindings 18 and 20 are known in the art and function to securely attach a foot covering of a user (not shown), typically a boot, to body 12. Snowboard 10 has a width measured transversely to a longitudinal axis 22 of body 12. The width of body 12 is greatest at regions 24 and 26 located on opposing ends of longitudinal axis 22 and is most narrow at a portion of body 12 located between regions 24 and 26, referred to as a waist 28. Body 12 is typically formed from semi-rigid construction that allows flexing of board 12 when supported at its longitudinal extremities and pressured in the center. The length of body 12 is generally approximately 4-7 times the maximum width of body 12. The maximum width of board is at regions 24 and 26, tapering to a minimum width waist 28 that is typically 70% to 90% of the maximum width. Typically, the maximum width is from about 9 to 113 inches and the length of board 12 measured along longitudinal axis 22 is from 4 to 6 feet. Bindings 18 and 20 are positioned in waist 28 to facilitate control over the movement of snowboard 10 by application of weight/force of the use. Disposed about perimeter 15 is strip of conductive material 34, typically formed from metal, such as aluminum. Portions of material 34 located proximate to waist 28 provide sufficient friction between the snow and board 12 so to facilitate control of board 12 in response to the weight/force, e.g., to control the turning of board 12 as the same traverses over crystalline water, i.e., snow.

Surface 16 is constructed to move over snow with little friction. To that end, surface 16 may be fabricated from any suitable material. For example, surface 16 may comprise a layer polymer-based materials, such as polytetrafluoroethylene, PTFE, ultra-high-molecular-weight polyethylene, UHMWPE and the like. In one embodiment, body 12 may be of unitary construction, i.e., the entire body 12 is fabricated from the poly-based material.

Referring again to FIGS. 1 and 2, in the example, shown, body 12 includes a core 30 fabricated from any suitable material laminated with fiberglass. Examples of material that may be laminated include wood, aluminum, composite honeycomb, foam and/or resin. Examples of wood that may be employed include beech, poplar, bamboo and birch. However, it should be understood that virtually any material may be used to fabricate core 30. The desired attributes of the material from which core 30 is fabricated is to minimize weight while providing desired damping, rebound, strength and flex. Surface 16 is typically integrally formed with abuse 32 portion of board 12. As a result, base portion 32 is generally fabricated using the materials discussed above with respect to surface 16. It is desired, however, that base portion 32 include amorphous regions suitable to adhere to wax. In this manner, wax may be applied to surface 16 to facilitate providing board 12 with variety of operational characteristics dependent upon the environment in which board 12 will be used and the person preferences of the user. As a result, it is desired that surface. Base portion 32 is attached to core typically with suitable adhesives. Base, which is attached to core 1 portion that contacts the snow.

Figure 3:
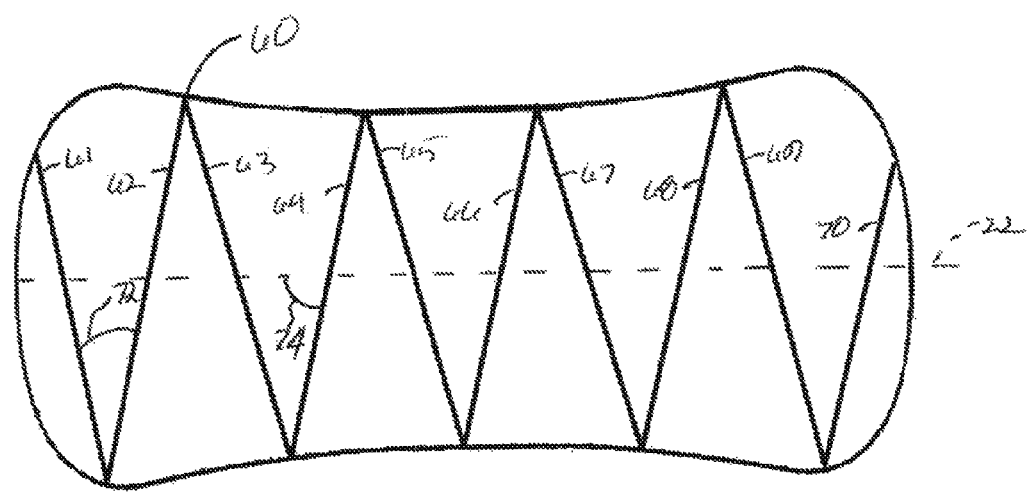
FIG. 3 bottom view the snowboard shown in FIG. 1 shown the electrical conductors.

Referring to both FIGS. 2 and 3, snowboard 10 is configured to reduce friction between base portion 32 and the snow by attenuating, if not ending, the build-up of static electricity between surface 16 and snow. To that end, base portion 32 includes an electrical conductor 60 in electrical communication with both surface 16 and material 34. With this configuration, electrical conductor 60 allows static electricity proximate to surface 16 to propagate to material 34 and be discharged in the region of the snow not in superimposition with snowboard 10. To that end, electrical conductor 60 and material 34 may be manufactured from any suitable electrically conductive material such as aluminum, copper, gold and allows thereof. As such, material 34 operates as a discharge connector. To facilitate discharge of static electricity into the snow, electrical conductor 60 includes a plurality of spaced-apart conductive paths 61-70. Adjacent paths 61-70 form an oblique angle 72 therebetween and an oblique angle 74 with respect to longitudinal axis 22. It should be understood, however, that virtually any configuration of electrical conductor may be employed. For example, the electrical conductor may include a plurality of spaced apart conductive paths 161-164 extending parallel between opposed regions of discharge connector 134, shown in FIG. 4. Although paths 161-164 are shown extending parallel to longitudinal axis 122, the may form any angle with respect thereto, include orthogonal and oblique angles.

Figure 5:
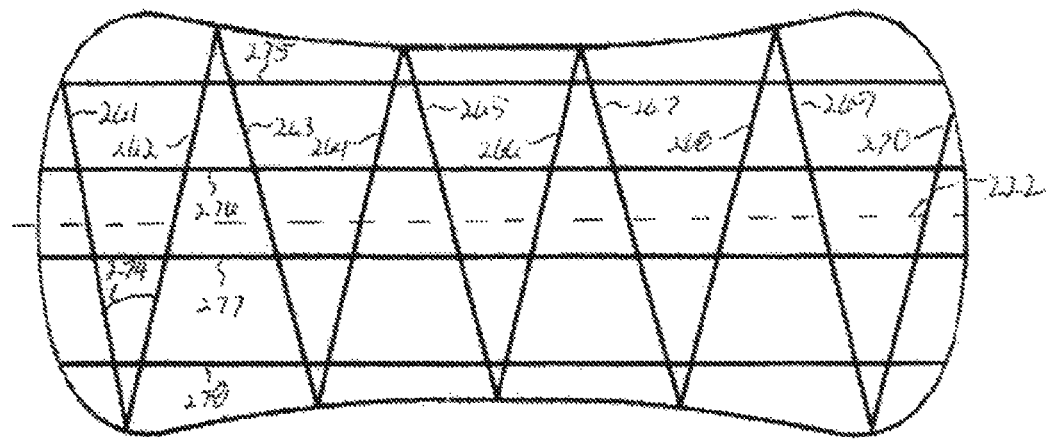
FIG. 5 bottom view the snowboard town in FIG. 3 in accordance with a second alternate embodiment of the present invention.

Alternatively, the electrical conductor may include first and second sets of conductive paths, shown in FIG. 5. The first set extending across a width of base portion 32 and adjacent paths 261-270 being in electrical communication and forming an oblique angle 274 therebetween. Electrical paths 275-278 of the second set extend transversely to the first set and parallel to one another. Although paths 275-278 are shown parallel to longitudinal axis 222, this is not necessary. Rather they may form any angle with respect to longitudinal axis 222, such as orthogonal and oblique angles.

Figure 6:
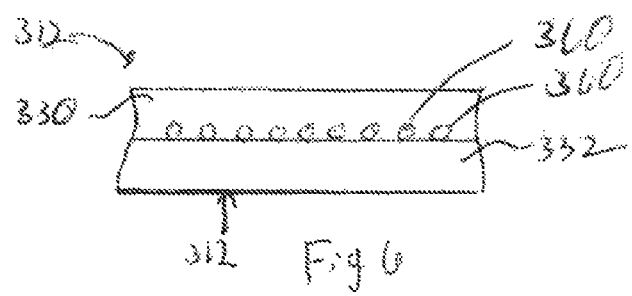
FIG. 6 is a detailed view of the snowboard body, shown in FIG. 2, in accordance with a third alternate embodiment of the present invention.

In yet another embodiment, base portion 332 may be formed from an electrically conductive material, shown in FIG. 6. Electrical conductive material from which base portion 332 may be manufactured may include any polymer based material impregnated with conductive material, such as graphite. An example of such material is sold under the mark DURASURF™ ASC, available from Crown Plastics Co. Inc, of Harrison, Ohio. To facilitate conduction of static electricity away from base portion 332, a plurality of conductive wires 360 are disposed in core 330 of board 312. Conductive wires 360 are partially encapsulated by core 330 in that a segment of each of conductive wires 360 contacts base portion 332.

Figure 7:
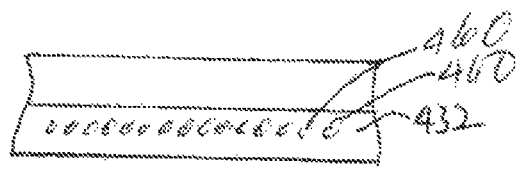
FIG. 7 is a detailed view of the snowboard body, shown in FIG. 6, in accordance with a fourth alternate embodiment of the present invention.
Figure 6:
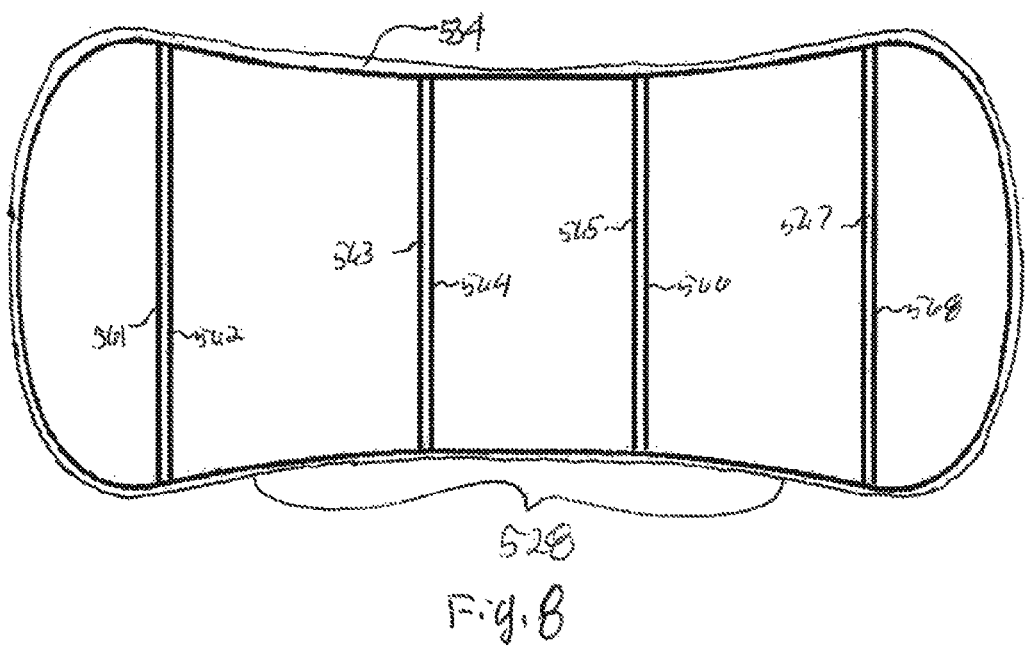

Referring to both FIGS. 6 and 7, alternatively conductive wires 460 may be embedded in base portion, which may or may not be formed from electrically conductive material, e.g., base portion 432 may be fabricated from the same material as base portion 332 or base portion 32, shown in FIG. 2. Referring again to FIGS. 6 and 7, wires 360 and 460 are in electrical communication with discharge conductor 34, shown in FIG. 1.

Figure 4:
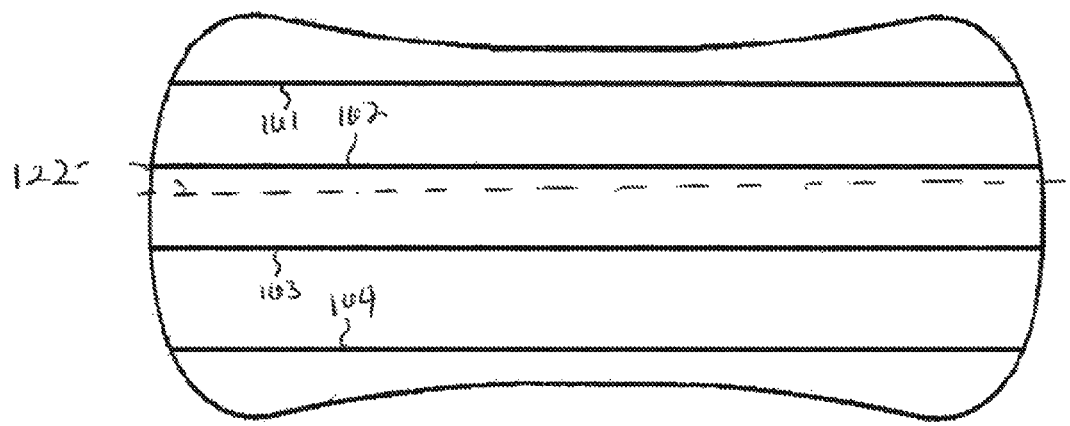
FIG. 4 bottom view the snowboard shown in FIG. 3 in accordance with a first alternate embodiment of the present invention.

Referring to both FIGS. 4, 6 and 7, conductive wires 360 and 460 may have the same orientation as conductive paths 161-164. Alternatively, a sub portion or all of wires 360 or 460 may extend transversely, if not orthogonally, to longitudinal axis across the width of base portion 32, shown as wires 561-568, shown in FIG. 8. As shown, wires 561 and 562 are disposed proximate one end of body 12, and wires 567 and 568 are disposed at an opposing end. Wires 563-566 are disposed proximate to waist 528. It should be understood that conductive wires 460 may be employed without the use of an electrically conductive surface 412, i.e., surface may be electrically non-conductive. In this fashion, inductive coupling of the static electricity to conductive wires facilitates transmission of the same to discharge conductor 34, shown in FIG. 1.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, while the invention has been described as being used in conjunction with a snow board, it may be employed in other systems for use on crystalline water, such as skis, sleds, snow sit skis and snowmobile treads employing rubber. In addition, the invention may be employed in systems for use on liquid water such as water skis, wake board, jet ski hulls, boat hulls, windsurf board hulls and water sit skis. Therefore, the scope of the appended claims should be accorded the broadest interpretation so as to encompass all such modifications and similar arrangements.

The invention claimed is:

1. A water slider comprising:
   an electrically insulative body extending along a longitudinal axis and having opposed surfaces with a perimeter edge extending therebetween;
   an electrical conductor positioned proximate to one of said opposed surfaces; and
   a discharge connector in electrical communication with said electrical conductor and disposed upon said perimeter edge.

2. The water slider as recited in claim 1 wherein said electrical conductor includes a plurality of spaced apart conductive paths in superimposition with said one of said opposed surfaces and encapsulated by said insulative body.

3. The water slider as recited in claim 1 wherein said electrical conductor includes a plurality of spaced apart conductive paths extending across a width of said one of said opposed surfaces.

4. The water slider as recited in claim 1 wherein said electrical conductor includes a plurality of spaced apart conductive paths extending across a width of said one of said opposed surfaces and further including a conductive layer covered by a portion of said electrically insulative body, with said conductive paths being in electrical communication with said conductive layer.

5. The slider as recited in claim 1 wherein said electrical conductor includes a plurality of conductive paths extending across a width of said one of said opposed surfaces, with adjacent paths being in electrical communication and forming an oblique angle therebetween.

6. The slider as recited in claim 1 wherein said electrical conductor includes a plurality of spaced apart conductive paths extending parallel between opposed regions of said discharge connector.

7. The slider as recited in claim 1 wherein said electrical conductor includes first and second sets of conductive paths, with said first set extending across a width of said one of said opposed surfaces, with adjacent paths being in electrical communication and forming an oblique angle therebetween and the electrical paths of said second set extending transversely to said first set.

8. The slider as recited in claim 1 wherein said electrical conductor includes first and second sets of conductive paths, with said first set extending across a width of said one of said opposed surfaces, with adjacent paths being in electrical communication and forming an oblique angle therebetween and adjacent paths of said second set extending parallel.

9. The slider as recited in claim 1 wherein said electrical conductor includes a conductive coating disposed upon said one of said opposed surfaces.

10. The slider as recited in claim 1 wherein said electrical conductor includes a conductive coating covering the entire area of said one of said opposed surfaces.

11. A water slider comprising:
a body formed from an electrically insulative member doped with electrically conductive material, said body extending along a longitudinal axis and having opposed surfaces with a perimeter edge extending therebetween;
an electrical conductor positioned proximate to one of said opposed surfaces; and
a discharge connector in electrical communication with said electrical conductor.

12. The water slider as recited in claim 11 wherein said electrical conductor includes a plurality of spaced apart conductive paths in superimposition with said one of said opposed surfaces and encapsulated by said insulative body.

13. The water slider as recited in claim 11 wherein said electrical conductor includes a plurality of spaced apart conductive paths extending across a width of said one of said opposed surfaces.

14. The water slider as recited in claim 11 wherein said electrical conductor includes a plurality of spaced apart conductive paths extending across a width of said one of said opposed surfaces and further including a conductive layer covered by a portion of said electrically insulative body, with said conductive paths being in electrical communication with said conductive layer.

15. The slider as recited in claim 11 wherein said electrical conductor includes a plurality of conductive paths extending across a width of said one of said opposed surfaces, with adjacent paths being in electrical communication and forming an oblique angle therebetween.

16. The slider as recited in claim 11 wherein said electrical conductor includes a plurality of spaced apart conductive paths extending parallel between opposed regions of said discharge connector.

17. The slider as recited in claim 11 wherein said electrical conductor includes first and second sets of conductive paths, with said first set extending across a width of said one of said opposed surfaces, with adjacent paths being in electrical communication and forming an oblique angle therebetween and the electrical paths of said second set extending transversely to said first set.

18. The slider as recited in claim 11 wherein said electrical conductor includes first and second sets of conductive paths, with said first set extending across a width of said one of said opposed surfaces, with adjacent paths being in electrical communication and forming an oblique angle therebetween and adjacent paths of said second set extending parallel.

19. The slider as recited in claim 11 wherein said electrical conductor includes a conductive coating disposed upon said one of said opposed surfaces.

20. The slider as recited in claim 11 wherein said electrical conductor includes a conductive coating covering the entire area of said one of said opposed surfaces.

* * * * *